United States Patent
Sowul et al.

(10) Patent No.: US 7,261,660 B2
(45) Date of Patent: *Aug. 28, 2007

(54) ELECTRICALLY VARIABLE TRANSMISSION ARRANGEMENT WITH TRANSFER GEAR BETWEEN GEAR SETS AND CLUTCHES

(75) Inventors: Henryk Sowul, Oxford, MI (US); Alan G. Holmes, Clarkston, MI (US); Michael R. Schmidt, Carmel, IN (US); Donald Klemen, Carmel, IN (US); James D. Hendrickson, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/131,564

(22) Filed: May 18, 2005

(65) Prior Publication Data

US 2006/0025265 A1   Feb. 2, 2006

Related U.S. Application Data

(60) Provisional application No. 60/591,995, filed on Jul. 29, 2004.

(51) Int. Cl.
 *F16H 3/72* (2006.01)

(52) U.S. Cl. .................. 475/5; 475/149; 475/151; 475/282; 180/65.2; 180/65.7

(58) Field of Classification Search .............. 475/5, 475/149, 151, 282; 477/3, 4, 5; 180/65.2, 180/65.7; 701/22; 903/911, 917, 918, 919
See application file for complete search history.

(56) References Cited

U.S. PATENT DOCUMENTS

| | | | | |
|---|---|---|---|---|
| 6,155,364 | A * | 12/2000 | Nagano et al. | 180/65.2 |
| 6,176,808 | B1 * | 1/2001 | Brown et al. | 477/5 |
| 6,478,705 | B1 * | 11/2002 | Holmes et al. | 475/5 |
| 6,527,658 | B2 | 3/2003 | Holmes et al. | 475/5 |
| 6,732,526 | B2 * | 5/2004 | Minagawa et al. | 60/706 |
| 2006/0019785 | A1 * | 1/2006 | Holmes et al. | 475/5 |
| 2006/0025259 | A1 * | 2/2006 | Klemen et al. | 475/5 |
| 2006/0025263 | A1 * | 2/2006 | Sowul et al. | 475/5 |
| 2006/0046886 | A1 * | 3/2006 | Holmes et al. | 475/5 |

* cited by examiner

Primary Examiner—David D. Le

(57) ABSTRACT

An electrically variable transmission is provided including an input member to receive power from an engine about a primary axis; an output member connected to a transfer member for transmitting power to a secondary axis; first and second motor/generators; and first and second simple planetary gear sets each having first, second and third members. The input member is continuously connected to the first member of the first gear set, and the output member is continuously connected to the first member of the second gear set. The first motor/generator is continuously connected to the second member of the first gear set. The second motor/generator is continuously connected with the third member of the first or second gear set. First and second torque transfer devices are positioned on one side of the transfer member, and the first and second gear sets are positioned on an opposite side of the transfer member.

19 Claims, 3 Drawing Sheets

ELECTRICALLY VARIABLE TRANSMISSION ARRANGEMENT WITH TRANSFER GEAR BETWEEN GEAR SETS AND CLUTCHES

CROSS-REFERENCE TO RELATED APPLICATION

This application claims the benefit of U.S. Provisional Application No. 60/591,995, filed Jul. 29, 2004, which is hereby incorporated by reference in its entirety.

TECHNICAL FIELD

The present invention relates to an electrically variable transmission having two simple planetary gear sets, two motor/generators, and a transfer gear between the gear sets and two clutches, and providing input split and compound split ranges.

BACKGROUND OF THE INVENTION

Internal combustion engines, particularly those of the reciprocating piston type, currently propel most vehicles. Internal combustion engines are relatively efficient, compact, lightweight, and inexpensive mechanisms by which to convert fossil fuel into useful mechanical power, so they are very suitable for vehicle propulsion. A novel transmission system which can reduce emissions and fuel consumption when used with internal combustion engines may be of great benefit to the public.

The flexibility with which reciprocating piston internal combustion engines operate poses challenges. Typically, a vehicle is propelled by such an engine, which is started from a cold state by a small electric motor and relatively small electric storage batteries, then quickly placed under the load of effecting propulsion and operating accessory equipment. Such an engine is also operated through a wide range of speeds and a wide range of loads and typically at a fifth of its maximum power. These wide ranges of engine operation require that clean, efficient combustion be maintained through extremes in operating conditions—an elusive goal.

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary, and clutches or torque converters that allow smooth transitions between driving ratios to start the vehicle from rest and accelerate to the desired highway speed with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. A series electric drive suffers from the weight of the electric machinery necessary to transform all engine power from mechanical to electrical and from electrical to mechanical, and from the useful power lost in this double conversion.

A power split transmission can use what is commonly understood to be a "differential gearing" to achieve a continuously variable torque and speed ratio between input and output without sending all power through the variable elements. An electrically variable transmission can use differential gearing to send a fraction of its transmitted power through a pair of electric motor/generators and the remainder of its power through another, parallel path that is all mechanical and direct, of fixed ratio, or alternatively selectable. One form of differential gearing, as is well known to those skilled in this art, may constitute a planetary gear set. In fact, planetary gearing is usually the preferred embodiment employed in differentially geared inventions, with the advantage of compactness and different torque and speed ratios among all members of the planetary gearing set. However, it is possible to construct this invention without planetary gears, as by using bevel differential gears or other differential gears.

For example, a set of bevel differential gears found in a typical automobile axle consists of three or four bevel pinions on a carrier and a meshing bevel gear for each axle. To replace the first set of planetary gearing in the first embodiment of the invention, the carrier of a first set of bevel differential gears would be connected to the input, one bevel gear that would normally be connected to an axle would instead be connected to the first motor, and the other such bevel gear would be connected to the central shaft. Bevel differential gears could likewise replace the second set of planetary gearing, and so the invention could be embodied without any planetary gears.

A hybrid electrically variable transmission system for a vehicle also includes an electric storage battery, which allows the mechanical output power to vary from the mechanical input power, engine starting with the transmission system and regenerative vehicle braking.

An electrically variable transmission in a vehicle can simply transmit mechanical power. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

One of the most successful substitutes for the series hybrid transmission is the variable, two-mode, input-split, parallel, hybrid electric transmission. Such a transmission utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

Operation in a first or second mode may be selectively achieved by using clutches in the nature of torque transfer devices. In one mode the output speed of the transmission is proportional to the speed of one motor/generator, and in the second mode the output speed of the transmission is generally proportional to the speed of the other motor/generator.

In some embodiments of the variable, two-mode, input-split, parallel, hybrid electric transmission a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

Accordingly, there is a need in the art for a large horsepower transmission system which provides maximum power with little additional power provided by the electric storage device. It is also desirable to enhance overall efficiency at high output speeds. These objectives can be achieved by a two-mode, compound-split, electromechanical transmission that provides the desired high efficiency sought for continuous, constant-speed operation as well as high-average power applications.

U.S. Pat. No. 6,527,658, issued Mar. 4, 2003 to Holmes et al, and commonly assigned with the present application, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, providing input power split or compound power split modes of operation, and one fixed ratio is available. A "fixed ratio" is an operating condition in which no power flows through the motor/generators to minimize losses.

U.S. Provisional Ser. No. 60/590,427, to Holmes et al, filed Jul. 22, 2004 under attorney docket number GP-305519, entitled "Electrically Variable Transmission with Selective Fixed Ratio Operation", commonly owned with the present application, and hereby incorporated by reference, discloses an electrically variable transmission having two planetary gear sets, two motor/generators, and three, four or fives torque transfer devices to provide input split, compound split, output split, neutral and electric reverse modes of operation.

SUMMARY OF THE INVENTION

The present invention provides stick diagram configurations which correspond with the power flows described in the above-referenced U.S. Pat. No. 6,527,658 and the above-referenced U.S. Provisional Ser. No. 60/590,427 to Holmes et al., filed Jul. 22, 2004 and entitled "Electrically Variable Transmission with Selective Fixed Ratio Operation."

The stick diagrams are not merely power flows but rather provide packaging and location information for the planetary gear sets, clutches, motors, shafts, bearings, etc. A stick diagram is a precursor to an actual cross section in that it identifies where each component will be positioned, and in what manner components will be supported and interconnected. The stick diagrams also show how the various clutches are positioned and supported between or adjacent planetary gear sets within hubs or piston housings.

More specifically, the invention provides an electrically variable transmission including an input member to receive power from an engine about a primary axis; an output member connected to a transfer member for transmitting power to a secondary axis; first and second motor/generators; and first and second simple planetary gear sets each having first, second and third members. The input member is continuously connected to the first member of the first gear set, and the output member is continuously connected to the first member of the second gear set. The first motor/generator is continuously connected to the second member of the first gear set. The second motor/generator is continuously connected with the third member of the first or second gear set. A first torque transfer device selectively grounds the second member of the second gear set. A second torque transfer device selectively connects the second member of the second gear set to the first electric motor/generator. The third member of the first gear set is selectively or continuously connected with the third member of the second gear set. The first and second torque transfer devices are positioned on one side of the transfer member, and the first and second gear sets are positioned on an opposite side of the transfer member.

The first, second and third members of the first gear set are embodied as a carrier, a sun gear, and a ring gear, respectively, and the first, second and third members of the second gear set are embodied as a carrier, ring gear and sun gear respectively.

An optional third torque transfer device selectively grounds the third member of the first gear set, wherein the third torque transfer device is positioned between the first and second gear sets.

Further, a radially extending support member centrally supports the second motor/generator between the first and second planetary gear sets.

The transfer member may be embodied as a transfer gear or a drive sprocket and transfer chain. In one embodiment, the first torque transfer device is positioned radially inside the drive sprocket.

The above features and advantages, and other features and advantages of the present invention are readily apparent from the following detailed description of the preferred embodiments for carrying out the invention when taken in connection with the accompanying drawings.

DESCRIPTION OF THE PREFERRED EMBODIMENTS

Figure 1:
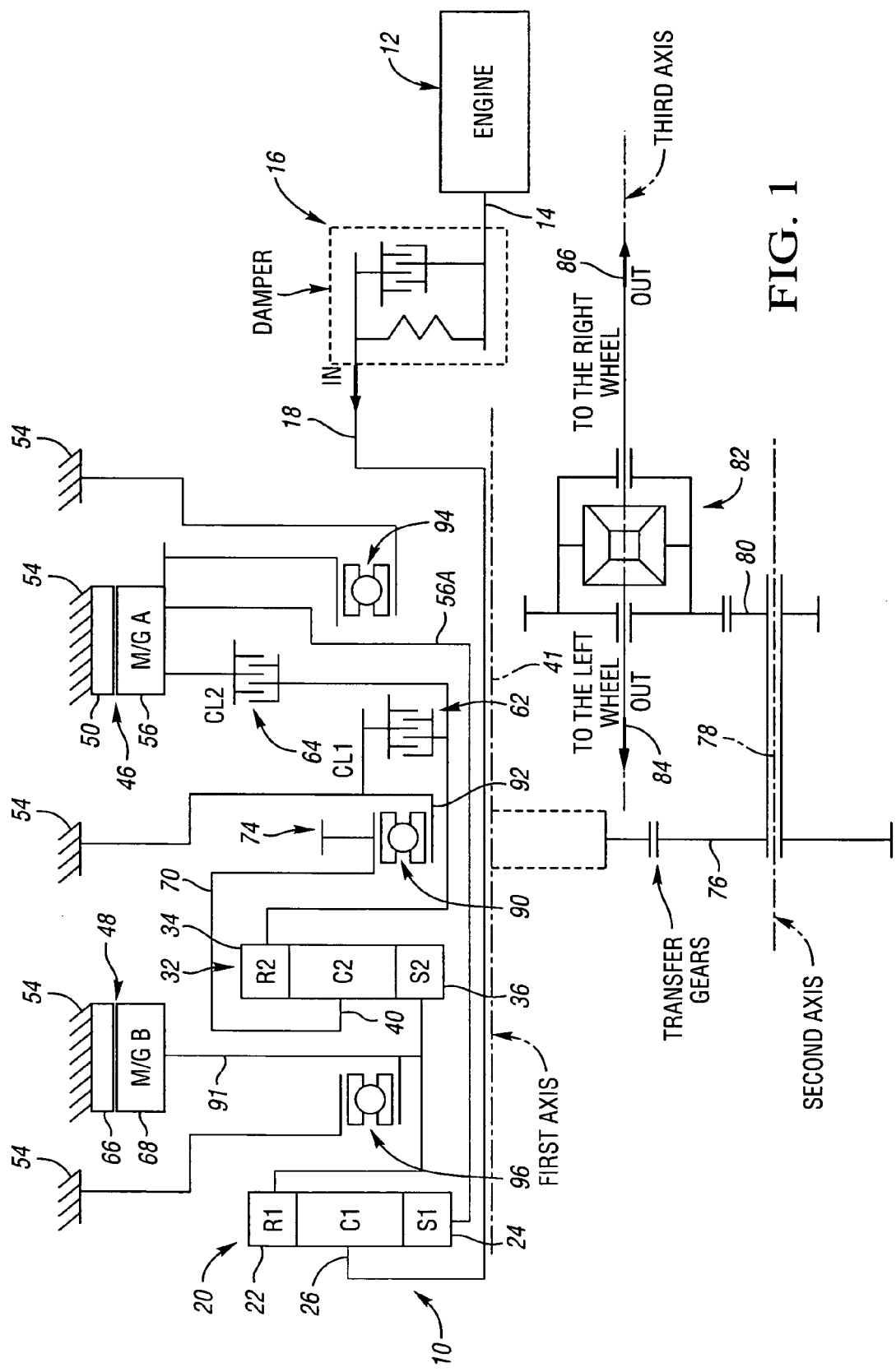
FIG. 1 shows a schematic stick diagram of an electrically variable transmission in accordance with the present invention.

Referring to FIG. 1, one preferred embodiment of the improved electrically variable transmission is designated generally by the numeral 10. The transmission 10 is designed to receive at least a portion of its driving power from an engine 12. As shown, the engine 12 has an output shaft 14 that may also serve as the forward input member of a transient torque damper 16. Transient torque dampers are well known in the art, but irrespective of the particular transient torque damper 16 employed, the output member thereof serves as the input member 18 of the transmission 10.

In the embodiment depicted, the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 18, the transmission input member 18 is operatively connected to a planetary gear set 20 in the transmission 10. The transmission 10 utilizes two gear sets, preferably in the nature of simple planetary gear sets. The first planetary gear set 20 employs an outer ring gear 22 which circumscribes an inner sun gear 24. A carrier 26 rotatably supports a plurality of planet gears such that each planet gear simultaneously and meshingly engages both the outer ring gear 22 and the inner sun gear 24. The input member 18 is secured to the carrier 26 of the first planetary gear set 20.

The second planetary gear set 32 also has an outer ring gear 34 which circumscribes an inner sun gear 36. A plurality of planet gears are rotatably supported on a carrier 40 such that each planet gear engages both the outer ring gear 34 and the inner sun gear 36 simultaneously.

Whereas both planetary gear sets 20 and 32 are simple planetary gear sets, the first and second planetary gear sets 20 and 32 are compounded in that the sun gear 36 of the planetary gear set 32 is continuously connected with the ring gear 22 of the planetary gear set 20.

This embodiment 10 also incorporates first and second motor/generators 46 and 48, respectively. The stator 50 of the first motor/generator 46 is secured to the transmission housing 54. The rotor 56 of the first motor/generator 46 is secured to the sun gear 24 of the first planetary gear set 20 via rotor support member 56A. The stator 66 of the second motor/generator 48 is also secured to the transmission housing 54. The rotor 68 of the second motor/generator 48 is centrally supported and secured to the sun gear 36 via radially extending rotor support member 91.

The ring gear 34 of the second planetary gear set 32 is selectively grounded to the housing 54 by a first clutch means in the nature of a torque transfer device 62 (CL1). That is, the grounded ring gear 34 is selectively secured against rotation by an operative connection to the non-rotatable housing 54. The ring gear 34 of the second planetary gear set 32 is also selectively connected to the rotor 56 of the first motor/generator 46 by a second clutch means in the nature of a torque transfer device 64 (CL2). The first and second torque transfer devices 62 and 64 are employed to assist in the selection of the operational modes of the hybrid transmission 10.

The two planetary gear sets 20 and 32 are coaxially oriented about the first axis 41.

The output drive member 70 of the transmission 10 is secured to the carrier 40 of the second planetary gear set 32. As depicted in FIG. 1, the output drive member 70 is connected to a transfer gear 74, which transfers power to the secondary gear 76. The power is then transferred about the second axis 78 from the gear 80 to the differential 82, and finally to the left and right wheels 84, 86.

As shown, in this configuration, the transfer gear 74 is positioned between the planetary gear set 32, and between the torque transfer devices 62, 64. The transfer gear 74 is also positioned between the planetary gear set 32 and the motor support member 56A. The transfer gear 74 is supported on a bearing 90 which is rigidly supported on a hub 92 with respect to the transmission housing 54. The motor/generators 46, 48 are supported on bearings 94, 96, respectively.

Operation of the transmission 10 is described in the above-referenced U.S. Pat. No. 6,527,658.

As illustrated in FIG. 1 of the present application, only the support member 91 and bearing are packaged between the two simple planetary gear sets 20, 32, while the transfer gear 74, bearings 90, 94, clutches 62, 64, and motor/generator support member 56A are all packaged beside the planetary gear set 32 (i.e., not between the planetary gear sets 20 and 32).

As referred to in the appended claims, the "first" planetary gear set (input gear set) is the gear set 20, and the "second" planetary gear set (output gear set) is the gear set 32. As shown, the output gear set 32 is positioned between the input gear set 20 and the input member 18. The "first" motor/generator is the motor/generator 46, and the "second" motor/generator is the motor/generator 48. The claimed first, second and third members of the first planetary gear set 20 are the carrier 26, sun gear 24, and ring gear 22, respectively. The first, second and third members of the second planetary gear set 32 are the carrier 40, ring gear 34, and sun gear 36, respectively.

Figure 2:
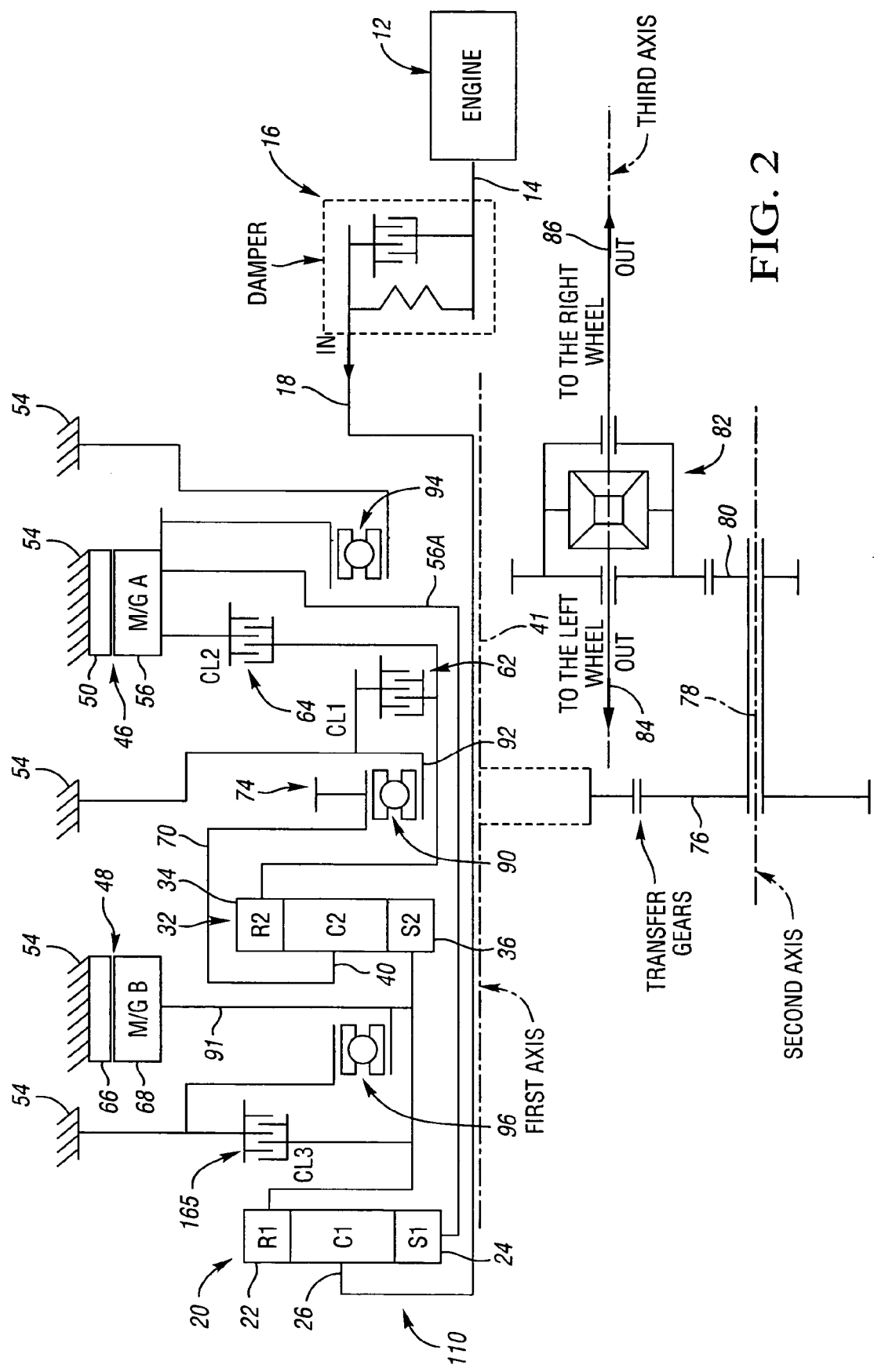
FIG. 2 shows a schematic stick diagram of an electrically variable transmission in accordance with a first alternative embodiment of the present invention.

Turning to FIG. 2, a transmission 110 is shown which is nearly identical to that shown in FIG. 1. Like reference numerals are used in FIG. 2 to describe like components from FIG. 1. The transmission 110 shown in FIG. 2 is identical to the transmission 10 shown in FIG. 1, except that the torque transfer device 165 has been added. The torque transfer device 165 (CL3) selectively connects the sun gear 36 of the second planetary gear set 32 with the transmission housing 54. The torque transfer device 165 (CL3) is a friction clutch which is operative as an overdrive brake to provide a third fixed ratio for the transmission 110. The remaining components are identical to those described above with respect to FIG. 1. This description will not be repeated here.

Figure 3:
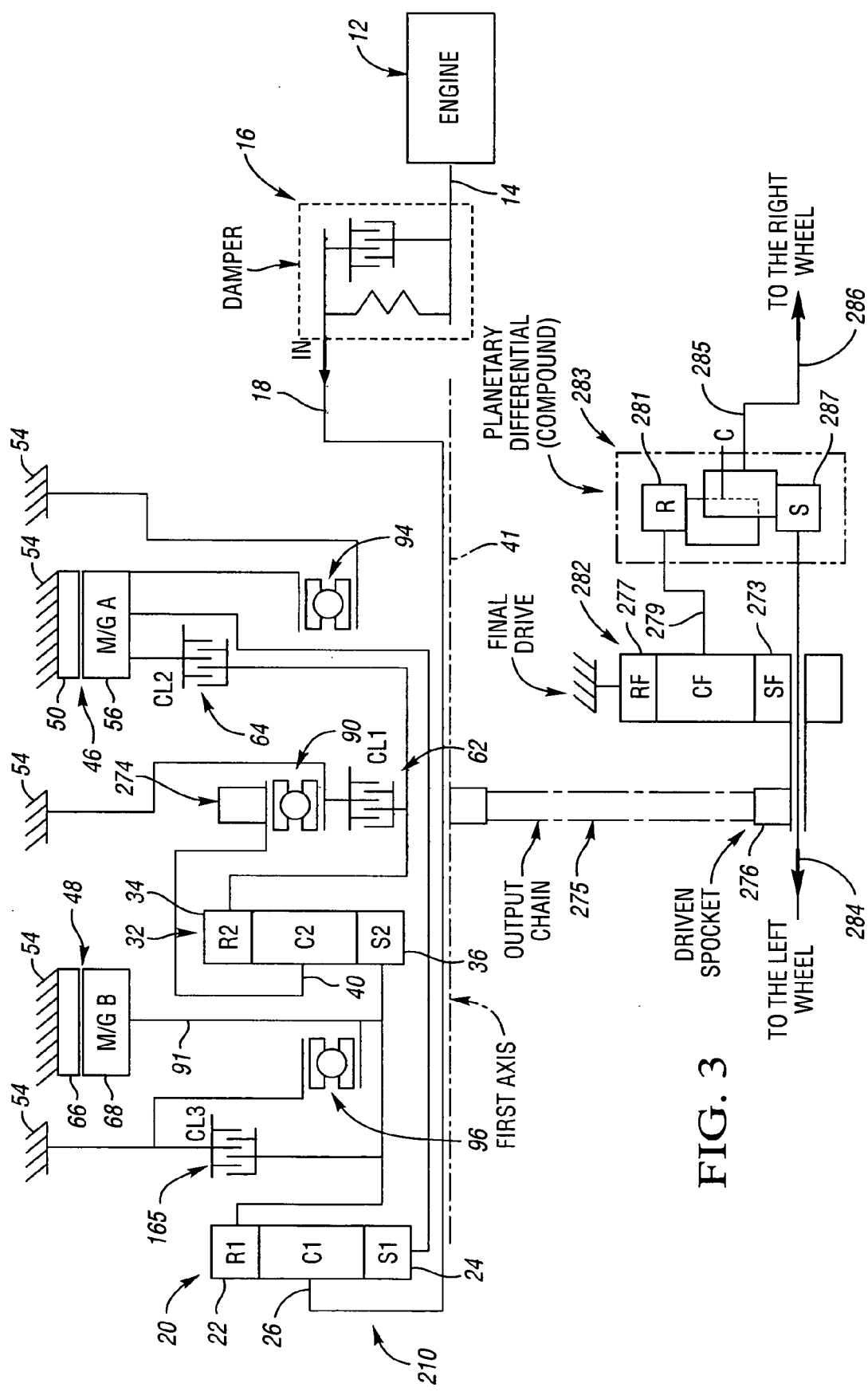
FIG. 3 shows a schematic stick diagram of an electrically variable transmission in accordance with a second alternative embodiment of the present invention.

Turning to FIG. 3, the transmission 210 of FIG. 3 is identical to the transmission 110 shown in FIG. 2, except that the transfer gear 74 and gear 76 of FIG. 2 have been replaced by the drive sprocket 274, transfer chain 275 and driven sprocket 276 of FIG. 10. FIG. 3 also shows a final drive planetary gear set 282, which has a sun gear 273 connected with the driven sprocket 276, a grounded ring gear 277, and a carrier 279 which is connected to a ring gear 281 of a compound planetary differential 283 which includes a carrier 285 connected to the right wheel 286, and a sun gear 287 connected to the left wheel 284.

As illustrated in FIG. 3, the clutch 62 is positioned at least partially radially inside said drive sprocket 274. By using the transfer chain 275 instead of a transfer gear, the transmission is converted from a 3-axis architecture to a 2-axis architecture; note that the transmissions 10 and 110 of FIGS. 1 and 2 have axes 41, 78 and wheel axes 84, 86, while the transmission 210 of FIG. 3 has a primary axis 41 and a secondary wheel axis 284,286), which reduces mass and packaging requirements.

While the best modes for carrying out the invention have been described in detail, those familiar with the art to which this invention relates will recognize various alternative designs and embodiments for practicing the invention within the spirit and scope of the invention defined herein.

The invention claimed is:

1. An electrically variable transmission comprising:
   an input member to receive power from an engine about a primary axis;
   an output member connected to a transfer member for transmitting power to a secondary axis;
   first and second motor/generators;
   first and second simple planetary gear sets each having first, second and third members;
   said input member being continuously connected to said first member of said first gear set, and said output member being continuously connected to said first member of said second gear set;
   said first motor/generator being continuously connected to said second member of said first gear set;
   said second motor/generator being continuously connected with said third member of said first or second gear set;
   a first torque transfer device selectively grounding said second member of said second gear set;
   a second torque transfer device selectively connecting said second member of said second gear set to said first electric motor/generator; and
   a third torque transfer device selectively grounding said third member of said first gear set, said third torque transfer device being positioned between said first and second gear sets;
   wherein said third member of said first gear set is selectively or continuously connected with said third member of said second gear set; and
   wherein said first and second torque transfer devices are positioned on one side of said transfer member, and said first and second gear sets are positioned on an opposite side of said transfer member.

2. The electrically variable transmission of claim 1, further comprising a rotor support member and rotor support bearing for said first motor/generator at said one side of said transfer member.

3. The electrically variable transmission of claim 1, wherein said first, second and third members of said first gear set comprise a carrier, a sun gear, and a ring gear, respectively, and said first, second and third members of said second gear set comprise a carrier, ring gear and sun gear respectively.

4. The electrically variable transmission of claim 1, wherein said second motor/generator is centrally supported on a radially extending support member positioned between said first and second planetary gear sets.

5. The electrically variable transmission of claim 1, wherein said transfer member comprises a transfer gear rotatably supported on a bearing.

6. The electrically variable transmission of claim 1, wherein said transfer member comprises a drive sprocket rotatably supported on a bearing and engaged with a transfer chain.

7. The electrically variable transmission of claim 6, wherein said first torque transfer device is positioned at least partially radially inside said drive sprocket.

8. An electrically variable transmission comprising:
   an input member to receive power from an engine;
   an output member connected to a transfer member for transmitting power to a secondary axis;
   first and second motor/generators;
   first and second simple planetary gear sets each having first, second and third members;
   said input member being continuously connected to said first member of said first gear set, and said output member being continuously connected to said first member of said second gear set;
   said first motor/generator being continuously connected to said second member of said first gear set;
   said second motor/generator being continuously connected with said third member of said second gear set;
   a first torque transfer device selectively grounding said second member of said second gear set;
   a second torque transfer device selectively connecting said second member of said second gear set to said first electric motor/generator; and
   a third torque transfer device selectively grounding said third member of said first gear set;
   wherein said first and second torque transfer devices are positioned on one side of said transfer member, and said first and second gear sets are positioned on an opposite side of said transfer member.

9. The electrically variable transmission of claim 8, further comprising a rotor support member and rotor support bearing for said first motor/generator at said one side of said transfer member.

10. The electrically variable transmission of claim 8, wherein said first, second and third members of said first gear set comprise a carrier, sun gear and ring gear, respectively, and said first, second and third members of said second gear set comprise a carrier, ring gear and sun gear respectively.

11. The electrically variable transmission of claim 8, wherein said third torque transfer device is positioned between said first and second gear sets.

12. The electrically variable transmission of claim 8, wherein said second motor/generator is centrally supported on a radially extending support member positioned between said first and second planetary gear sets.

13. The electrically variable transmission of claim 8, wherein said transfer member comprises a transfer gear rotatably supported on a bearing.

14. The electrically variable transmission of claim 8, wherein said transfer member comprises a drive sprocket rotatably supported on a bearing and engaged with a transfer chain.

15. The electrically variable transmission of claim 14, wherein said first torque transfer device is positioned at least partially radially inside said drive sprocket.

16. An electrically variable transmission comprising:
   an input member to receive power from an engine about a primary axis;
   an output member connected to a transfer member for transmitting power to a secondary axis;
   first and second motor/generators;
   first and second simple planetary gear sets each having first, second and third members;
   said input member being continuously connected to said first member of said first gear set, and said output member being continuously connected to said first member of said second gear set;
   said first motor/generator being continuously connected to said second member of said first gear set;

said second motor/generator being continuously connected with said third member of said first or second gear set;

a first torque transfer device selectively grounding said second member of said second gear set;

a second torque transfer device selectively connecting said second member of said second gear set to said first electric motor/generator;

wherein said third member of said first gear set is selectively or continuously connected with said third member of said second gear set;

wherein said first and second torque transfer devices are positioned on one side of said transfer member, and said first and second gear sets are positioned on an opposite side of said transfer member;

wherein said transfer member comprises a drive sprocket rotatably supported on a bearing and engaged with a transfer chain; and wherein said first torque transfer device is positioned at least partially radially inside said drive sprocket.

17. An electrically variable transmission comprising:

an input member to receive power from an engine;

an output member connected to a transfer gear;

first and second motor/generators;

first and second simple planetary gear sets each having a sun gear member and a ring gear member, each of which meshingly engage a plurality of gear members rotatably mounted on a carrier;

said input member being operatively connected to said carrier of said first planetary gear set;

said output member being operatively connected to said carder of said second planetary gear set;

one of said first and said second motor/generator operatively connected to said sun gear member in said first planetary gear set;

the other of said first and said second motor/generator being in continuous, operative connection with said sun gear member of said second gear set and with said ring gear member of said first gear set;

a first torque transfer device selectively grounding said ring gear member of said second gear set;

a second torque transfer device selectively connecting said ring gear member of said second gear set to said first motor/generator; and a third torque transfer device selectively grounding said sun gear member of said second gear set, said third torque transfer device being positioned between said first and second gear sets;

wherein said first and second torque transfer devices are positioned on one side of said transfer member, and said first and second gear sets are positioned on an opposite side of said transfer member.

18. The electrically variable transmission of claim 17, wherein said second gear set is positioned between said input member and said first gear set.

19. The electrically variable transmission of claim 17, further comprising a rotor support member and rotor support bearing for said second motor/generator positioned between said first and second gear sets.

* * * * *